UNITED STATES PATENT OFFICE.

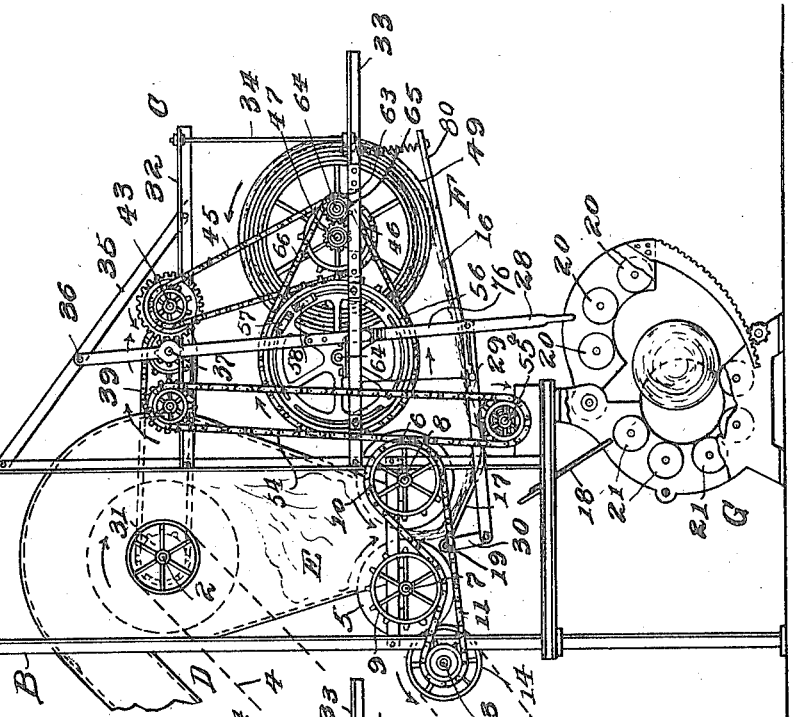

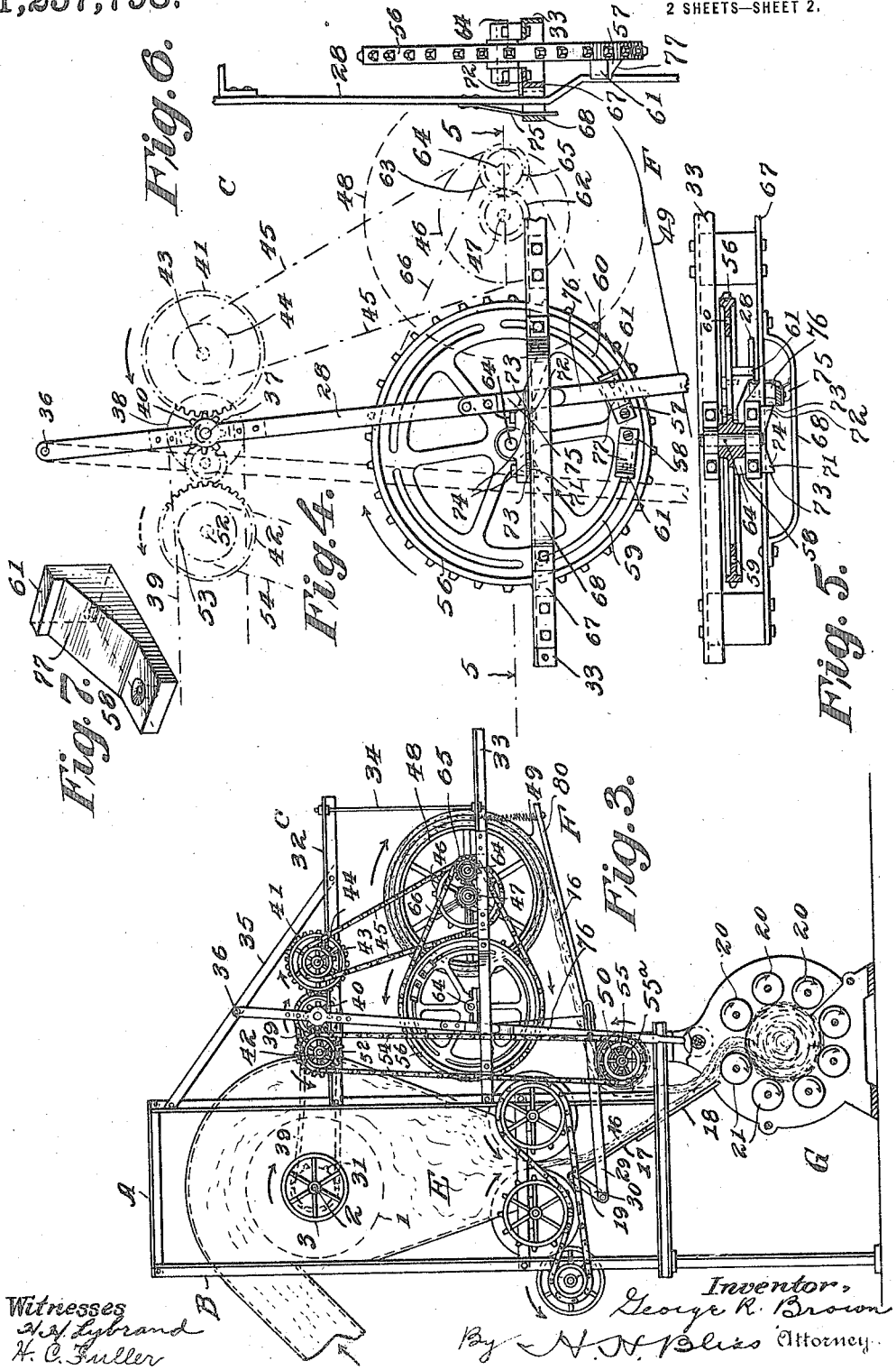

GEORGE RAYMOND BROWN, OF OKLAHOMA, OKLAHOMA; WALTER BROWN, OF ASHWOOD, TEXAS, TEMPORARY ADMINISTRATOR OF SAID GEORGE RAYMOND BROWN, DECEASED, ASSIGNOR, BY DIRECT AND MESNE ASSIGNMENTS, TO CLAYTON GIN COMPRESS CO., OF HOUSTON, TEXAS, A CORPORATION OF TEXAS.

COTTON PREPARING AND BALING MACHINERY.

1,257,798.   Specification of Letters Patent.   Patented Feb. 26, 1918.

Application filed March 9, 1914, Serial No. 823,432. Renewed July 12, 1917. Serial No. 180,242.

*To all whom it may concern:*

Be it known that I, GEORGE R. BROWN, a citizen of the United States, residing at Oklahoma city, in the county of Oklahoma and State of Oklahoma, have invented certain new and useful Improvements in Cotton Preparing and Baling Machinery, of which the following is a specification, reference being had therein to the accompanying drawing.

This invention relates to improvements in apparatus, used for producing compact bales of cotton, involving intermittingly-starting-and-stopping bale-forming mechanism, continuously-acting mechanism for forming the loose bat which is fed to the bale-former, continuously-acting condensing mechanism which supplies the cotton to the bat-former, and intermittingly-acting accumulating devices which temporarily receive, and properly dispose of, the forward end portions of the bats coming from the bat-former during the brief periods when the baling mechanism is at rest and is discharging the bales.

The object of the invention is to provide, first, an accumulator with intermittingly-acting operative parts, all of which (*a*) shall be positively driven in timed relation with the bat-forming and the condensing mechanism, (*b*) shall have a receiving device which will be fixed in position, as concerns any bodily movements thereof, (*c*) shall be entirely independent of the bale-forming mechanism, and (*d*) can be optionally connected to and disconnected from the power driver; second, a bat-forming apparatus which shall be continuous in its action and operated in timed relation with the ginning and with the condensing mechanism; and, third, an intermittingly-acting baling press all of whose operative parts can be stopped and started independently of the accumulator and of the other parts referred to.

Heretofore the movements of the bat accumulating devices and the movements of the bale-forming mechanism have been intimately associated; in some cases, the rotary parts of the accumulator being actuated by frictional contact with one or another of the rotary parts of the press mechanism; and in other cases, the accumulators each have a cumbersome temporary bat support which must be bodily moved (by complicated mechanism comprising numerous parts) from one of its positions to another.

In the accompanying drawings:

Figure 1 is a side elevation illustrating partly in detail, and partly conventionally, a condenser, a bat-forming accumulator, and a bale-forming apparatus, with the parts in the positions occupied when they are all at work;

Fig. 2 is a side elevation of the same parts, but in the positions occupied by them when the bat accumulator is at work, and the bale is being removed;

Fig. 3 is a side elevation of the same parts, illustrating them in the positions occupied at the time when the accumulated bat is being delivered to the press, together with the bat that is newly formed;

Figs. 4, 5, and 6 show detached parts.

Fig. 7 is a perspective detail view of one of the tripping devices for stopping the accumulator.

The frame work or support upon which the operative parts are mounted is indicated by A, B, C. A is the main support or foundation of the entire structure; B, that part of the frame work which supports the condensing apparatus D and the bat former E; and C, the supplemental frame which carries the accumulating apparatus F and the driving mechanism therefor.

The baling press, as an entirety, is indicated by G.

I have shown more or less in detail the several mechanical parts which are comprised in each of the general elements that have been specified and will refer to them, somewhat in detail; but it will be understood that in numerous respects there can be modifications of the mechanisms or devices shown without departing from the essential features of the invention.

The condenser at D receives the cotton continuously from the gins. It has a drum 1 carried by shaft 2 which is suitably mounted in the frame work. This shaft has a pulley 3 driven continuously by belt 4 from the gin shafting.

The lint cotton which is received from the gin is carried over by the drum 1 and is deposited in the bottom of the condenser hopper.

From the bottom of the condenser the cotton passes continuously to the bat-forming rolls 5 and 6. These are carried by shafts 7 and 8 to which also are secured the sprocket wheels 9 and 10. With these wheels engages the sprocket chain 11 driven by wheel 12 on the shaft 13. This shaft has a pulley 14 which, by means of a belt 15, is driven continuously from the gin shafting. The chain 11 is arranged to so engage, with the sprocket wheels 9 and 10, respectively, that the bat-forming rolls 5 and 6 will be turned in opposite directions and constantly feed the bat 16 from the condenser, ready to be delivered to the bale-forming press.

The bat passes from the rolls 5 and 6 over an inclined chute 17, 18. The part 18 is fixed rigidly in position, but the part 17 is pivoted at 19 so that it can swing from its position of delivery to the press to the position of delivery to the accumulating mechanism.

The bale-forming press, indicated as a whole by G, is more or less conventionally shown and is one of the class of those in each of which use is made of a series of compression rolls 20 and 21 arranged to surround a bale-forming chamber. When these are in their working position the space or chamber which they surround is approximately cylindrical in form. But some of the rolls (those at 20) are mounted in a movable frame section which is adapted to carry them away from the bale-forming chamber so that a bale, after being completed, can be discharged therefrom.

The compression rolls 20 and 21 are provided respectively with pinions 22, which engage with a driving gear 23. This gear receives power in such way as to make the press mechanism entirely independent of the bat accumulator, the condenser and the bat-formers. As shown, there is a driving pulley 24 which receives power from the belt 25 connected to a pulley on a counter-shaft 23. At 27 there is a clutching mechanism by which the power can be optionally cut off entirely from the press when the rolls are to be stopped and the baling chamber opened for the withdrawal of a bale.

Any suitable mechanism can be employed which is adapted to readily stop and start the press, and has a driving mechanism entirely independent of the accumulator and the bat-former.

A baling mechanism having details of construction, such as are shown in Patent No. 980,706 to Treese, dated January 3, 1911, can be used. And as reference can be made to that patent, for an illustration and description of all the necessary details, it is not necessary to give such description here.

Suffice it to say that when a bale has been finished, the devices which swing the movable roll-carrier away from the baling chamber are connected to the power, the press is opened, and the bale is discharged.

28 is a hand lever pivoted at its upper end, and connected by a link 29 to the section 17 of the bat chute. As shown, this link is not connected directly to the chute, proper, but to a crank arm 30 which is secured to the chute. When the lever 28 is moved to the right (see Fig. 1) it, through the link 29 and the crank 30, swings the bat chute upward to the position shown in Fig. 2. This severs the bat, the part below the line of severing or tearing passing on into the press as the last portion of the cotton pressed into the bale, while the forward end of the newly formed bat coming from the forming rolls 5 and 6 is carried up by the swinging chute 17 to, and is received by, the accumulating devices which are constructed and operated as follows:

The shaft 2 of the condenser drum is provided with a second pulley 31, and transmits power to devices that are supported upon the extension, or supplemental, frame C. This frame has horizontally arranged bars 32, 33 with studs or uprights 34, and braces 35; there being of such frame parts as many as are desired or found necessary.

Upon this framework is mounted, and from it is suspended, the aforesaid lever 28, as by the pivots or hinge devices 36 connecting it to the bracing 35. Two of these levers or suspended links can be employed, if desired, one at each side of the stationary frame, and connected together to provide a firm carrier for the parts supported upon it. In this lever system there is mounted a swinging shaft 37 upon which there is a pulley 38 connected by the belt 39 to the aforesaid pulley 31 on the condenser shaft 2. This belt and these pulleys constantly rotate the shaft 37 in one direction. Upon this shaft there is a spur pinion 40 adapted to swing with the lever system. This pinion can engage with and rotate either of two gear wheels 41 and 42. The wheel 41 is carried by a shaft 43, which is suitably mounted upon the frame-bars 32. This shaft also carries a sprocket wheel 44 which by a chain 45 is connected to a sprocket wheel 46 on the shaft 47, suitably mounted on the lower frame-bars 33. To this shaft 47 is secured a relatively large drum 48. 49 is a web of suitable cloth having one end secured to the peripheral part of the drum 48, the other end being similarly secured to the outer surface of a drum 50, which is mounted in a lower horizontal plane and so arranged as to have the severed end of the bat brought close to it when the movable bat chute 17 swings upward in the way above described. The cloth web 49 is wound upon the drum 48 as it is unwound from the drum 50. As soon as the end of the bat is brought into contact with the cloth web which is unwinding from the drum 50 it rests thereon and the bat is carried up by the cloth web and winds upon the drum 48 in the way illustrated in Fig. 2, alternate coils of cotton and cloth web being formed as such winding on the drum 48 continues.

The lever system 28, being moved outward, not only swings the bat chute 17 upward, as described, but also throws the pinion 40 into engagement with the gear wheel 41 and this puts in motion the chain gearing at 44, 45, and 46 and rotates the drum 48. The parts are so related that the bat chute 17 reaches the surface of the cloth web wound on roller 50 just as the pinion 40 comes into mesh with the wheel 41, so that the torn end of the bat is immediately engaged by the cloth web and carried toward the accumulator drum 48.

At the time the lever system 28 is moved outward to effect these results, the baling press is stopped in its action, the power being cut off from the compressing devices, and thrown onto the roll swinging mechanism, so that the bale-forming chamber is quickly opened and the bale ejected; all of the movements and adjustments of the parts incident to the bale-former being independent of the movements of the parts comprising the rest of the apparatus. The bale is ejected from the press and all the parts of this mechanism are again brought to their normal working position, in a short period of time, and are ready to again receive the flow of cotton batting.

The lever 28 is moved back from the position shown in Fig. 2 to that shown in Fig. 1. As it moves back the bat chute section 17 drops again to its normal position, its gravity being sufficient to lower it and to swing outward the crank 30, drawing outward with it the link 29; and thereupon the flow of the bat from the formers 5 and 6 is restored, and the cotton again enters the press.

That body of cotton which, while the press was being opened and the bale discharged, accumulated upon the roll 48 in the way described, is now also delivered to the press by the following devices. The lever 28 is carried from its neutral position (as in Fig. 1) inward far enough to bring the pinion 40, carried thereby, into engagement with the spur wheel 42 on the shaft 52 mounted on the upper framework 32. To this shaft 52 there is also secured a sprocket wheel 53, which, by a chain 54, is connected to the sprocket 55 on the shaft 55$^a$ of the lower drum 50.

During the above description it has been assumed that an operator has manually effected the control of the driving mechanism which connects the power devices, first with one train of parts, and then with another, and has been giving attention to the apparatus while so controlling it.

But in order to relieve the operators of giving attention to a number of these matters, and to provide for automatically stopping the winding up of the accumulated bat on the drum 48, and stopping the unwinding thereof, that is, stopping the rotation of the drum 50, automatically, at the instant when it delivers the end of the accumulated bat to the press mechanism, I have provided the following devices:

56 is a wheel so mounted in relation to the lever 28 that it can be utilized to cause the alternate movements of the latter, first in one direction, and then in the other. It is provided with trippers 57, 58, which are preferably seated in elongated slots 59 and 60 in the web portion of the wheel, they being adjustable tangentially in the slots so as to be brought into operation at one instant or another, as desired. These trippers have lugs or projections 61 which rotate in such paths that, if the lever 28 is suitably positioned, they can impinge upon it, one being adapted to push it in one direction, and the other in the opposite. The shaft 47 has a gear wheel 62 which meshes with a wheel 63 on a shaft 64 mounted on the lower frame 33. This shaft 64 also carries a sprocket wheel 65 which by means of the chain 66, is connected to the sprocketed periphery of the wheel 56.

When the power imparting parts are connected to the drum 48 and it is rotating in its winding-up direction, the wheels 62, 63 and the chain 66 rotate the wheel 56. After it has been moved a predetermined part of a rotation the tripper 61 impinges upon the lever 28 and swings it inward, bringing the continuously rotating pinion 40 to its neutral position, this stopping the drum 48 from its winding action.

When, on the other hand, the lever 28 has been moved farther inward, as in Fig. 3, to bring the wheel 40 into engagement with the wheel 42, and the lower drum 50 has been thus put into action, it, by its stress upon the cloth web 49, imparts reverse rotation to the drum 48; and the latter, through the gear wheels 62, 63, and the chain 66, rotates the wheel 56 in the opposite direction and finally brings the tripper 59 around to where it strikes the lever 28 and presses it in the opposite direction, that is to say, brings the lever back to its central or neutral position, thus disengaging the drive pinion 40 from the wheel 42, and stopping the rotation of the drum 50; this occurring, at the time that the final end of the accumulated bat section is delivered to the throatway of the press.

The lever is positively locked in either of its extreme positions, but it can be released from the lock devices either by hand or automatically; the provision for this being as follows:

The shaft 64 of the wheel 56 is mounted on the frame bar 33, and upon a bracket bar 67 secured to the frame, the bracket lying on one side of the wheel and the frame bar on the other. To the bracket bar 67 there is secured a supplemental bracket 68 having the principal part of the latter lying substantially parallel to, and being somewhat inside of, the bracket 67. 71 and 72 are lock stops secured to the bracket bar 67 and adjustable thereon. Each is formed with a squared end 73 with an inclined inner edge 74.

The lever 28 is adapted to be moved not only in the way above described, that is, in planes transverse to its uppermost pivot, but also in planes transverse to those aforesaid, planes substantially parallel to the plane of the axis of the shaft 64. Or the lower part 76 of the lever can be arranged to be so moved, this being the part which normally lies in the planes of the lugs 61. 75 is a spring bar or plate fastened at one end to the lever and at the other end bearing against the inner bracket bar 68, this spring constantly tending to push the lever into the plane of the lock stop 71, 72, and toward the adjustable lugs on the wheel. These trip lugs 57, 58, have inclined inner edges so that they can act as wedges or cams as the wheel revolves.

When one of the trip lugs 57, 58, comes to the lever 28, the inclined edge pushes the lever inward far enough to release it from the lock stops 71, 72, and immediately after such release the lever is impinged on the lug 61 on the trip cam and is drawn thereby toward its central position. As soon as the trip lug brings the lever to this central position, the pinion 40 has been disengaged from the wheel which it drives and the accumulator mechanism is stopped. The lever is free, however, to be moved by the operator's hand in planes parallel to the wheel in either direction, and as it, the lever, moves, the inclined edge 74 on one of the lock stops or the other causes the parts 76 of the lever to move in until it reaches the end of the stop, whereupon the spring 75 forces the lever outward far enough to bring it in the plane of the squared end 73 of the stop. It will remain locked in that position until the reverse motion of the wheel 56 brings the other cam lug 57 (or 58) around to the position where it, in turn, strikes the lever, its inclined edge 77 first releasing the lever from the end 73 of the lock stop, and then carrying it to the central or neutral position.

Of course, it will be seen that in many respects there can be modifications as concerns the details shown and described without departing from the essential features of my mechanism.

What I claim is:

1. The combination of the bat former, the bale forming mechanism, the accumulator, means for driving the accumulator in a direction to take up the bat and to cause it to thereafter deliver the bat to the bale former, a bat guide adapted to deliver the bat to the bale former or, alternately, to the accumulator, a manually operated device for controlling the accumulator which, when moved in one direction, causes the delivery of the bat to the accumulator and causes the taking up action of the accumulator, and when moved in the other direction causes both the guide and the accumulator to deliver cotton to the bale former.

2. The combination of the bat former, the bale former, the bat accumulator, the movable bat guide, the power driver for the accumulator, a reversible manually operated device which, when moved in one direction, causes the accumulator, under the operation of said driver, to take up the bat and also causes the guide to deliver the bat thereto, and, when moved in the other direction, causes the accumulator to deliver the bat to the bale former and causes the return of the bat guide to its initial position.

3. The combination of the continuously acting bat former, the intermittingly acting bale former, the reversible bat accumulator, the movable bat guide, the power driver for the accumulator, a reversible manually operated device for causing, when moved in one direction, the accumulator to operate in one direction to take up the bat and also moves the guide to deliver the bat to the accumulator, and for causing, when moved in the other direction, the return movement of the bat guide and also causing the operation of the accumulator in its opposite direction to deliver its bat to the bale former.

4. In an apparatus of the class described, the combination of the continuously-acting bat-former, the independent intermittingly-acting bale-former, the automatically movable bat guide, the accumulator comprising a reversible bat-supporting web, the web-winding rolls, the two intermittingly and oppositely-acting drivers respectively actuating the said rolls, the continuously-acting power transmitter for said drivers, and the reversible positively-driven tripper operating in timed relation with the accumulator for disengaging it at the ends of each of its movements.

5. In an apparatus of the class described, the combination of the continuously-acting bat-former, the intermittingly-acting bale-former, the accumulator having a reversible bat-supporting web, means for delivering the bat from the bat-former alternately to the bale-former and to the accumulator, a web-winding roll on a fixed axis near the normal path of the bat, a second fixed web-winding roll, means for winding the web alternately in opposite directions on the said rolls, and means for varying the action of the accumulator and automatically stopping it at either of several predetermined times relatively to the movements of the bat-former.

6. In an apparatus of the class described, the combination of the continuously-acting bat-former, the intermittingly-acting bale-former, and the movable bat guide, of a reversible accumulator, the two oppositely-acting drivers for the accumulator, the continuously-acting power transmitter for said drivers, and the positively driven tripper having two independently-acting trip elements each adjustable relatively to the entire cycle of the movement of the tripper.

7. In an apparatus of the class described, the combination of a continuously-acting bat-former, the intermittingly-acting bale-former, and the movable bat guide, of a reversible accumulator, the two oppositely-acting drivers for the accumulator, the continuously-acting power transmitter for said drivers, and the positively-driven tripper operating in timed relation with the accumulator for engaging it at the ends of its movements, first in one direction and then in the opposite direction.

8. In an apparatus of the class described, the combination of a continuously-acting bat-former, the intermittingly-acting bale-former, and the movable bat guide, of a reversible accumulator, the two oppositely-acting drivers for the accumulator, the continuously-acting power transmitter for said drivers, and the positively-driven tripper having two independent trip elements each adjustable independently of the other in relation to the entire cycle of movement of the accumulator.

9. In an apparatus of the class described, the combination of the continuously-acting bat-former, the intermittingly-acting bale-former, the movable bat guide, the accumulator having a reversible bat-supporting web, a fixed web-winding roll near the normal path of the bat, a second fixed web-winding roll, two independent drivers for said rolls each adapted to be positively actuated, a constantly-acting power transmitter adapted to alternately engage with the said drivers, means for manually throwing the said power transmitter and the said drivers alternately into and out of operative relations, and an intermittingly-acting automatic trip for the power transmitter operating in timed relations with the accumulator and adapted to disengage the transmitter from the said drivers alternately.

10. In an apparatus of the class described, the combination of the continuously-acting bat-former, the intermittingly-acting bale-former, the reversible accumulator, the movable bat guide for delivering the bat either to the bat-former or to the accumulator, said accumulator being adapted to alternately accumulate portions of the bat and deliver them to the bale-former, an adjustable trip operating in timed relations with the accumulator and adapted to automatically stop the accumulating action and simultaneously permit the return of the movable bat guide to its normal position, and means for manually connecting the power devices to the accumulator and causing it to deliver the accumulated bat to the bale-former.

11. The combination of the continuously acting bat former, the reversible accumulator, the intermittingly acting bale former, the bat guide intermediate of said formers adapted to deliver the bat to the bale former and also adapted to deliver it to the accumulator, means for moving the accumulator in one direction, means for moving the accumulator in the opposite direction, and a manually controlled device arranged to simultaneously cause the guide to deliver the bat to the accumulator and cause the accumulator to take up the forward end of said bat and arranged to also simultaneously return the guide to its initial position and to cause the accumulator to deliver the bat to the bale former.

In testimony whereof, I affix my signature, in presence of two witnesses.

GEORGE RAYMOND BROWN.

Witnesses:
J. ROSS RICHARDSON,
E. L. GELDER.

Copies of this patent may be obtained for five cents each, by addressing the "Commissioner of Patents, Washington, D. C."